BROMINE RECOVERY PROCESS

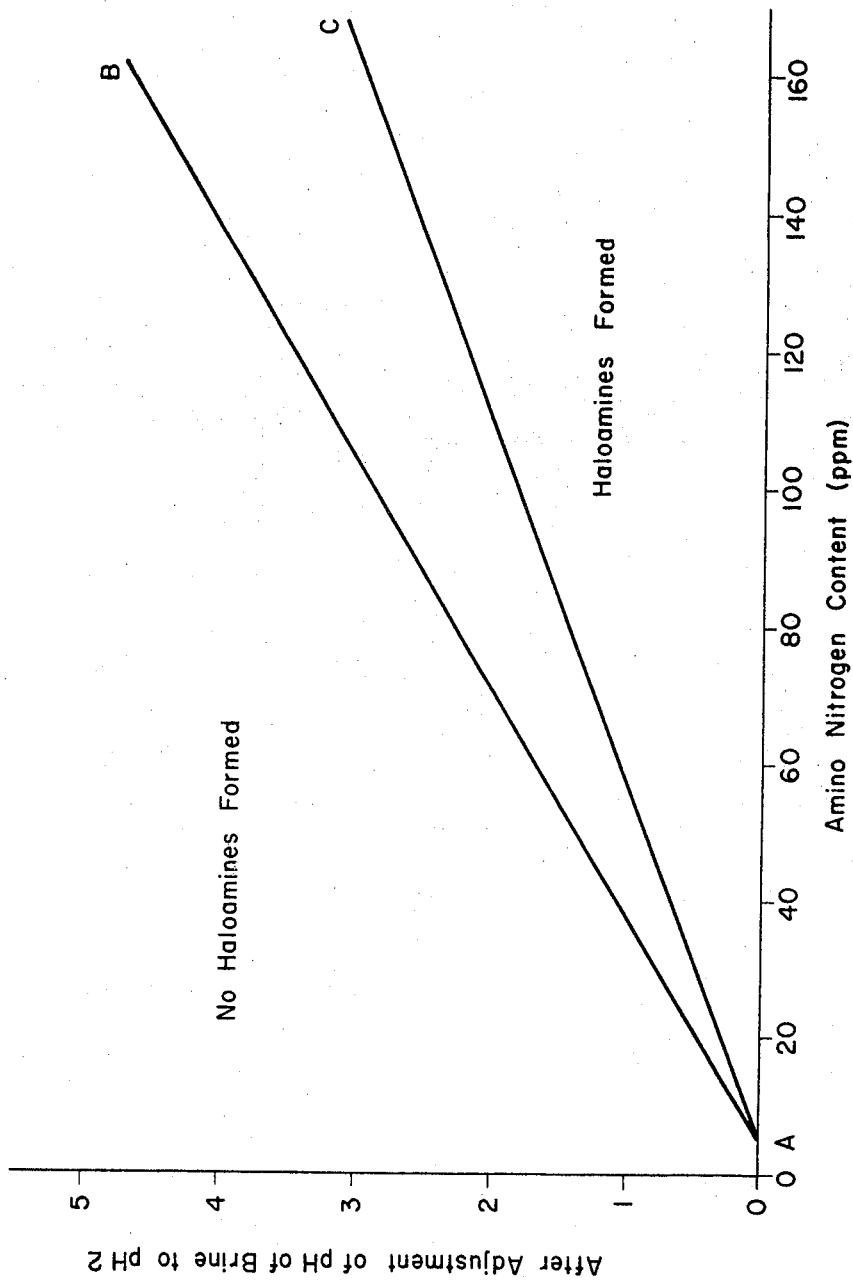

United States Patent Office 3,442,614
Patented May 6, 1969

3,442,614
ELIMINATION OF HALOAMINES IN SODIUM BROMIDE BRINES AND OTHER BROMIDE-CONTAINING SOLUTIONS IN BROMINE RECOVERY SYSTEMS
Charles D. Frazee, Springfield Township, Hamilton County, and Henry R. Greeb, Cincinnati, Ohio, assignors to The Procter & Gamble Company, Cincinnati, Ohio, a corporation of Ohio
Filed June 30, 1967, Ser. No. 650,467
Int. Cl. C01b 7/10
U.S. Cl. 23—216        7 Claims

ABSTRACT OF THE DISCLOSURE

A halogen acid, an aqueous solution of a halogen acid, or a halogen acid gas is added to a sodium bromide brine or other bromide-containing solution containing amino nitrogen, when the brine or solution is being processed to recover bromine, to prevent the formation of explosive haloamines.

Cross reference to related patents

A process for preparing tertiary amines by aminating alkyl bromides is described and claimed in the Patent of Jensen and Wyness, U.S. Patent 3,379,764, issued Apr. 23, 1968. The tertiary amines can be recovered from the final reaction product in the Jensen and Wyness process by the addition of sodium hydroxide; the sodium hydroxide produces a sodium bromide brine solution from which the tertiary amines are easily separated. It is also desirable for economic reasons to recover bromine from the sodium bromide brine.

Background of invention

The recovery of bromine from sodium bromide brines and other bromide-containing solutions is old in the art; see, for example, U.S. Patent 1,902,801, issued Mar. 21, 1933, and U.S. Patent 2,359,221, issued Sept. 26, 1944. In a typical bromine recovery process, the brine is oxidized with chlorine to produce sodium chloride and dissolved bromine. The bromine is stripped from the solution with steam, and it is then condensed and dried.

Haloamines will form in sodium bromide brines containing amino nitrogen when the brine is oxidized to produce free bromine; for example, the hydrogen group in dimethylamine, $(CH_3)_2NH$, will be replaced by bromine to form bromodimethylamine. Halomaines are unstable compounds; their content in the brine must be kept below about 10 p.p.m. to avoid concentrating potentially explosive levels of haloamines in the recovered bromine, in which they are more soluble than in the brine. A method for controlling or eliminating the formation of haloamines during bromine recovery processes such as those that can be practiced in conjunction with the Jensen and Wyness process has not heretofore been available. As a result, explosions caused by haloamines have occurred.

Summary of invention

The primary object of the present invention is to eliminate the formation of haloamines during the recovery of bromine from sodium bromide brines or other bromide-containing solutions which also contain amino nitrogen. This object is accomplished by adding a halogen acid (e.g., hydrofluoric acid, hydrochloric acid, hydrobromic acid, or hydroiodic acid but preferably hydrochloric acid or hydrobromic acid), an aqeuous solution of a halogen acid, or a halogen acid gas to a sodium bromide brine or other bromide-containing solution in an amount sufficient to block the formation of haloamines or to remove any haloamines which are formed when the bromine is being recovered.

The reaction to form haloamines in a sodium bromide brine occurs between an amino nitrogen-containing compound, such as methylamine, and the bromine or chlorine in solution. The undesired reaction is, where X is chlorine or bromine:

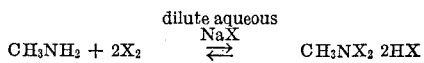

In a two phase system comprising water and an excess of bromine, the halogen acid formed in the above reaction remains in the water phase and the haloamine is extracted into the bromine. The haloamine can be detonated while the bromine is still in contact with the brine; however, in a typical bromine recovery process, the greatest danger of explosion occurs after the bromine containing the haloamine has been separated and purified.

In accordance with the process of the present invention, the undesired reaction leading to the formation of haloamines is reversed with an excess of halogen acid. This reaction is believed to be the formation in the brine of an amine hydrohalide (which is not explosive) such as $CH_3NH_2 \cdot HBr$, according to the following reaction:

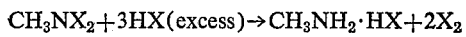

Amine hydrohalides are somewhat soluble in bromine; therefore, if bromine containing a hydrohalide is washed with water, the halogen acid is washed out and the amine is again free to react with the bromine to form a haloamine. For this reason, an excess of halogen acid must be used in the present invention to wash the bromine; the hydrohalides are extracted intact into the excess of halogen acid.

The amount of halogen acid required to eliminate the formation of haloamines in sodium bromide brines or other bromide-containing solutions is in excess of the amount of halogen acid needed to acidify the brine or the bromide-containing solution to pH 2. The minimum amount of hydrobromic acid which is used in a typical continuous chlorine oxidation process for recovering bromine from a sodium bromide brine is shown on line A–B in FIGURE 2 and more fully explained immediately below; the same result can be achieved by substituting molar equivalent amounts of hydrochloric acid.

Description of drawings

FIGURE 2 graphically shows the amount of hydrobromic acid required to eliminate the formation of haloamines in a typical continuous bromine recovery process. The percent equivalent of hydrobromic acid in the sodium bromide brine (after the brine has been neutralized with a halogen acid to pH 2) is plotted on the ordinate of FIGURE 2 and the amino nitrogen content of the brine in p.p.m. is plotted on the abscissa. In chlorinating sodium bromide brine to liberate bromine, sufficient halogen acid is added to the brine to operate in the area on or above line A–B of FIGURE 2. Below line A–C, haloamines are formed in the brine and in the area below line A–B but above line A–C, haloamines may be formed in the brine under certain operating conditions which are not always entirely predictable. Safe operating procedure requires the use of excess halogen acid at least equivalent to the amount shown on line A–B.

Figure 1:
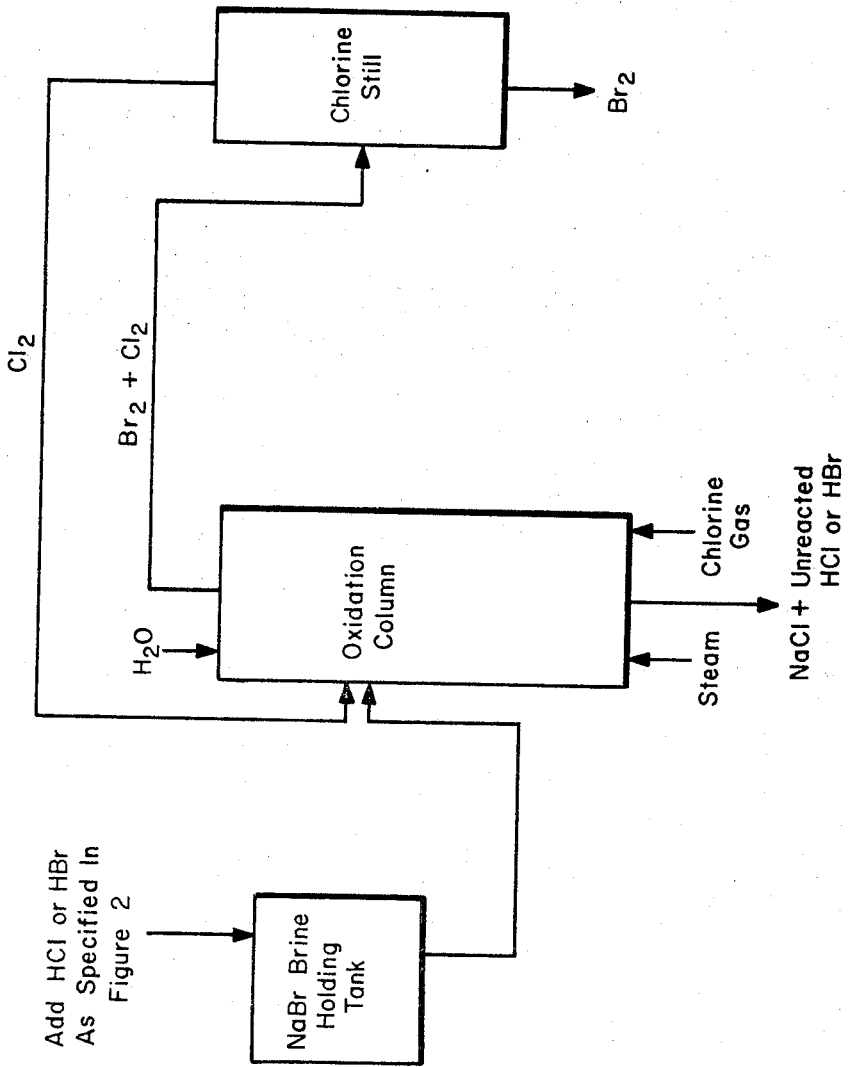
FIGURE 1 is a schematic representation of a bromine recovery process in which chlorine is used to oxidize a sodium bromide brine.

Lines A–B and A–C do not pass through the origin in FIGURE 2; at about 5 p.p.m. of amino nitrogen, the pH of the acidified brine (pH 2) is sufficient to block the formation of the haloamines.

Description of preferred embodiment

The description of a preferred embodiment of this invention is given below with reference to the accompanying drawings.

A sodium bromide brine is placed in a holding tank shown in FIGURE 1 and the pH of the brine, which is normally between 9 and 12, is adjusted to 2 by the addition of hydrobromic or hydrochloric acid. Acids other than halogen acids cannot be used to lower the pH of the brine. If, for example, sulfuric acid is used to adjust the pH of the brine, the sulfate ion interferes with the functioning of the halogen acid which must be added to the brine to form the hydrohalides. An excess of halogen acid, that is, an amount over and above that required to lower the pH to 2, is added to the brine based on its amino nitrogen content. This critical amount of halogen acid is determined by reference to FIGURE 2; the amount of acid should be equal to or greater than that shown by line A–B. After the addition of the halogen acid, the sodium bromide brine is withdrawn from the holding tank and injected into the middle of an oxidation column. Chlorine gas and steam are injected into the bottom of the column in order to oxidize the brine and the resultant bromine is stripped from the top of the column. Oxidation occurs in the column in accordance with the following equation:

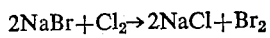

$$2NaBr + Cl_2 \rightarrow 2NaCl + Br_2$$

Sodium chloride and unreacted halogen acid are removed from the bottom of the column. The bromine removed from the top of the column is injected into a chlorine still to remove any chlorine which may be present in the bromine; the bromine is removed from the still and recovered from the process; the chlorine is recirculated to the oxidation column.

Water can be injected into the top of the oxidation column as indicated in FIGURE 1 to wash organic materials from the bromine. If the brine in the oxidation column has not been acidified with an excess of a halogen acid in the holding tank before being introduced into the oxidation column, a halogen acid, an aqueous solution of a halogen acid or a halogen acid gas can be injected into the oxidation column along with the water in accordance with the practice of this invention. For the reasons previously stated, an excess of water should not be used to wash the bromine.

In one embodiment of the present invention, a halogen acid gas is added to the brine to create a halogen acid in situ. Preferably, halogen acid gas is bubbled through the sodium bromide brine in the holding tank; however, it can also be added to the water used to wash the bromine. Sufficient halogen acid gas must be used to react with all the amino nitrogen in the brine to form amine hydrohalide. The amount of halogen acid gas required can be determined directly from FIGURE 2 in the case of bromine gas or by using a molar equivalent of chlorine gas.

Holding tanks, oxidation columns and stills are well known pieces of equipment and a detailed description of their construction is not required. These pieces of equipment as well as all piping, valves, pumps, and metering devices must be constructed from materials such as glass, quartz or ceramic which can withstand the corrosive action of bromine. The oxidation column and chlorine still are generally packed in the conventional manner; for example, with Rashig rings. A detailed description of equipment which can be used in bromine recovery systems is found in F. Yaron, "Bromine Manufacture: Technology and Economic Aspects," pp. 3–42 in Bromine and Its Compounds, Z. E. Jolles, ed., Academic Press, New York 1966.

The following specific examples are given to further explain and illustrate the present invention and they are not intended to limit the scope of the invention in any manner. Unless otherwise stated, all parts and percentages given in the examples are by weight.

Example I

One thousand grams of a 25 percent, impurity free, sodium bromide brine was placed in a three necked five liter glass flask equipped with an agitator, condenser and sparge tube; a draw-off valve was fitted on the bottom of the flask. Twenty grams of an aqueous 40 percent solution of monomethylamine was added to the brine to produce an amino nitrogen content in the brine of 8,000 p.p.m. Eighty five grams of a 37 percent solution of hydrochloric acid was then added to the brine; 39 grams of acid solution were required to bring the pH of the contents of the flask to 2. The remaining acid solution (46 grams) was equivalent to 2 percent free hydrochloric acid in the brine.

Approximately 270 grams of chlorine gas was bubbled through the sparge tube into the charge in the flask for forty minutes to oxidize the brine. When the reaction was complete, the contents in the flask were in two phases: the top phase contained sodium chloride and hydrochloric acid and the bottom phase was bromine which was withdrawn from the flask through the draw-off valve. The chlorine evolved during the oxidation reaction was trapped in the condenser which was cooled to about 90° F. with alcohol and water. During the oxidation reaction the charge in the flask was mildly agitated to disperse the chlorine gas throughout the contents of the flask.

An infrared analysis of the bromine withdrawn from the flask showed no trace of the haloamine.

This example illustrates the process of this invention in a batch operation in which a known quantity of amino nitrogen was added to a sodium bromide brine and destroyed by the addition of an excess of hydrochloric acid to the brine prior to the oxidation of the brine with chlorine gas.

Example II

A continuous pilot plant for oxidizing sodium bromide brine with chlorine gas was constructed with a 2¼ inch vertical glass oxidation column packed with ¼-inch ceramic Intallox saddles. A five liter stainless steel holding tank was connected to the oxidation column by a ¼-inch stainless steel line which was inserted into the side of the column at a point midway between the bottom and the top. The column was provided with 150 pound steam through a ¼-inch stainless steel line which entered the bottom of the column. A chlorine gas cylinder was connected to the bottom of the column by a ¼-inch Teflon tube. The bottom of the column was also fitted with a drain for removing sodium chloride and halogen acid. At the top of the column, a ¼-inch stainless steel water line was installed. Each supply line attached to the column was provided with a flow indicator and a metering pump or valve with which the flow of material through the line could be carefully regulated.

A 1½ inch glass line was connected to the top of the oxidation column to remove bromine and chlorine; this line passed through a glass condenser which was joined to a chlorine distillation column by a ¼-inch glass line. The chlorine distillation column was a vertical one inch diameter glass tube 36 inches long; it was pacekd with ¼-inch ceramic Intallox saddles. A valve for withdrawing bromine from the distillation column was located at the bottom of the column and a ¼-inch Teflon line for recycling chlorine (and bromine not removed by distillation) was run from the top of the chlorine distillation column back to the oxidation column to a point two inches above the entrance of the line from the holding tank.

An aqueous solution of monomethylamine was added to 60 pounds of a 25 percent sodium bromide brine in the holding tank of the continuous oxidation system described above. The monomethylamine concentration in the brine was 500 p.p.m. and equal to an amino nitrogen content of 226 p.p.m. The pH of the brine was adjusted to 2 by the addition of hydrochloric acid. The brine was metered to the oxidation column at a rate of 100 grams per minute and oxidized in the column with chlorine gas which was fed into the column at a rate of 9.3 grams per minute. Nineteen grams per minute of steam was used to strip bromine and chlorine from the column while water, added to the top of the column at a rate of 22 grams per minute, was being refluxed in the column. The temperature at the bottom of the oxidation column was maintained at 210° F. The bromine and chlorine removed from the oxidation column was passed through the condenser which was cooled with water to 120° F. and distilled in the chlorine distillation column, the bottom of which was heated to 140° F. Bromine was continuously removed from the bottom of the chlorine distillation column and samples of bromine were analyzed hourly for their haloamine content with the following results:

| Hour: | Haloamine, p.p.m. |
|---|---|
| 1 | 4890 |
| 2 | 8240 |
| 3 | 8050 |
| 4 | 7550 |
| 5 | 7550 |

After the fifth hourly sample of bromine had been withdrawn from the chlorine distillation coumn, a 1.8 percent excess of hydrochloric acid was added to the sodium bromide brine in the holding tank. The bromine sample removed from the chlorine distillation column had analyzed for haloamine one hour after the addition of hydrochloric acid contained 785 p.p.m. haloamine; a sample taken two hours after the addition of excess hydrochloric acid contained 200 p.p.m. of haloamine.

This example illustrates the directional effect of adding an excess of halogen acid to sodium bromide brine in a continuous chlorine oxidation system: the haloamine content in the bromine which is recovered from the system is substantially reduced. Greater amounts of halogen acid are required to totally eliminate the haloamines in the recovered bromine.

*Example III*

A 25 percent sodium bromine brine was prepared and 250 p.p.m. of monomethylamine were added to it (the amino nitrogen content of the brine was equal to 113 p.p.m.). The pH of the brine was neutralized to 2 with hydrochloric acid. The brine was oxidized at a rate of 100 grams per minute in the continuous chlorine oxidation equipment described in Example II using the general operating conditions which are set forth in the example. In this example, hydrobromic acid was added to the reflux water in the oxidation column in an amount sufficient to introduce four grams per minute of hydrobromic acid to the oxidation column. This was equivalent to a four percent excess of hydrobromic acid based on the weight of the brine being oxidized in the column. Samples of bromine withdrawn from the bottom of the chlorine distillation column after 30, 90 and 120 minutes' operation were found to be free of haloamines. After 120 minutes of operation, the amount of hydrobromic acid in the reflux water was reduced to two percent based on the weight of the brine being oxidized; otherwise, the operation of the system remained unaltered. Samples of bromine taken 150 and 180 minutes after start up continued to show no trace of haloamines; however, the samples of bromine analyzed after 240 and 270 minutes showed 180 and 230 p.p.m. of haloamine.

This example shows the addition of halogen acid to the oxidization column and the importance of using a sufficient excess of halogen acid to avoid building up a potentially explosive concentration of haloamines in the recovered bromine.

*Example IV*

Using the equipment and the general operating conditions described in Example II, bromine was recovered from a commercially obtained 25 percent sodium bromide brine which contained 30 p.p.m. of amino nitrogen. The pH of the brine was adjusted to 2 with hydrochloric acid before the brine was oxidized with chlorine; however, an excess of halogen acid was not added to the brine. One hour after start up, a trace of haloamine was detected in the bromine recovered from the system. The amount of haloamine in the bromine increased to 60 p.p.m. an hour later and to 330 p.p.m. an hour thereafter. At that time (i.e., three hours after start up) a one percent excess of hydrobromic acid was added to the reflux water in the oxidation column. One hour later, only a trace of haloamine could be found in the bromine recovered from the system. In samples of bromine analyzed an hour later and samples taken thereafter, no haloamines were found.

The same results can be achieved using molar equivalent amounts of hydrochloric acid, hydrofluoric acid, or hydroiodic acid in place of the hydrobromic acid. The halogen acid can be used in aqueous solution or, alternatively, in the form of a halogen acid gas. The excess of halogen acid can be added to the reflux water in the oxidation column or to the brine in the brine holding tank without altering the effect of the halogen acid on the elimination of the haloamines in the bromine.

*Example V*

Twenty-five p.p.m. of monomethylamine and 25 p.p.m. of dimiethylamine were added to a 25 percent sodium bromide brine to produce an amino nitrogen content of 19 p.p.m. The pH of the brine was adjusted to 2 by the addition of hydrobromic acid. Thereafter, a one percent excess of hydrobromic acid was added to the brine and the brine was oxidized with chlorine in the equipment described in Example II using the general operating conditions described in the example. No trace of haloamines was found in the bromine removed from the system.

1.8 percent of sodium sulfate was added to the brine and one hour later, the bromine removed from the system was found to contain 202 p.p.m. of haloamine. Subsequent samples of bromine taken at hourly intervals showed 1400 and 1700 p.p.m. of haloamine, respectively. At that time, the brine containing the sodium sulfate was replaced with brine containing 25 p.p.m. of monomethylamine and 25 p.p.m. of dimethylamine (i.e., the original brine without any sodium sulfate). One hour after the sodium sulfate had been removed from the system, the content of haloamine in the recovered bromine dropped to 448 p.p.m. An hour later it was down to 172 p.p.m. and still one hour later it had dropped to 70 p.p.m.

This example illustrates the manner in which the sulfate ion interferes with the elimination of haloamines in the presence of halogen acid. The same interference is observed when sulfuric acid rather than a halogen acid is used to adjust the pH of the brine. The example also illustrates the potentially dangerous manner in which haloamines in sodium bromide brines or other bromide-containing solutions can be quickly concentrated to dangerously high levels during bromine recovery operations.

Heishell and Farmer, U.S. Patent 2,705,219, teach the use of ultraviolet light to decompose nitrogen trichloride in chlorine vapor streams:

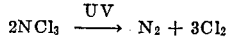

$$2NCl_3 \xrightarrow{UV} N_2 + 3Cl_2$$

Nitrogen trichloride is an unstable compound; it has been responsible for the explosion of chlorine gas cylinders. The Heishell and Farmer process makes it safer to store and to handle chlorine gas cylinders because these potentially explosive compounds are eliminated. But ultraviolet light has no effect on haloamines in bromine vapor streams. For example, an ultraviolet light was mounted on the outside of the upper section of the oxidation column described in Example II in such a manner that bromine containing a known amount of haloamine could be irradiated. In the experiment, no change in the concentration of haloamine was detected after thirty seconds irradiation time. Heishell and Farmer teach that less than one second of irradiation with ultraviolet light under comparable conditions is sufficient to destroy over ninety percent of the nitrogen trichloride in chlorine.

What is claimed is:

1. A process for eliminating the formation of haloamines during the recovery of bromine from sodium bromide brines containing monomethylamine and dimethylamine which comprises acidifying the brine to pH 2 with a halogen acid and adding a sufficient excess of halogen acid to the brine to block the formation of haloamines and to remove any haloamines formed in the recovered bromine.

2. The process of claim 1 wherein the halogen acid is an aqueous solution of a halogen acid or a halogen acid gas.

3. The process of claim 1 wherein the halogen acid is hydrochloric acid.

4. The process of claim 1 wherein the halogen acid is hydrobromic acid.

5. The process of claim 1 wherein the sodium bromide brine is chlorinated to recover the bromine.

6. The process of claim 5 wherein the pH of the sodium bromide brine is acidified to 2 with hydrobromic acid and an amount of additional hydrobromic acid is added to the brine which is equal to or greater than the amount shown on line A–B in FIGURE 2.

7. The process of claim 5 wherein the pH of the sodium bromide brine is acidified to 2 with hydrochloric acid and an amount of additional hydrochloric acid is added to the brine which is equal to or greater than the percent equivalent of hydrobromic acid shown on line A–B in FIGURE 2.

References Cited

UNITED STATES PATENTS

| 1,891,888 | 12/1932 | Grebe | 23—216 |
| 1,917,762 | 7/1933 | Grebe | 23—217 |
| 3,116,976 | 1/1964 | Gradisher et al. | 23—216 |

OSCAR R. VERTIZ, *Primary Examiner.*

G. O. PETERS, *Assistant Examiner.*